United States Patent [19]

Schaefer

[11] Patent Number: 5,323,644
[45] Date of Patent: Jun. 28, 1994

[54] TRACTION CONTROL ROAD SIMULATOR

[75] Inventor: Richard A. Schaefer, Ann Arbor, Mich.

[73] Assignee: Ford Motor Company, Dearborn, Mich.

[21] Appl. No.: 909,490

[22] Filed: Jul. 6, 1992

[51] Int. Cl.$^5$ ............................................. G01L 3/02
[52] U.S. Cl. .................................................. 73/117
[58] Field of Search ................... 73/116, 117, 117.1, 73/121, 123, 125, 126, 128, 129, 865.6

[56] References Cited

U.S. PATENT DOCUMENTS

| 3,832,894 | 9/1974 | Pelta | 73/117 |
| 3,898,875 | 8/1975 | Knoop et al. | 73/116 |
| 3,926,043 | 12/1975 | Marshall et al. | 73/117 |
| 3,995,475 | 12/1976 | Cline . | |
| 4,050,299 | 9/1977 | Maxwell | 73/126 |
| 4,092,855 | 6/1978 | Kinney | 73/862.12 |
| 4,161,116 | 7/1979 | Fegraus et al. | 73/117 |
| 4,520,444 | 5/1985 | Koos . | |
| 4,621,524 | 11/1986 | von Thun . | |
| 4,825,690 | 5/1989 | Mears . | |
| 4,862,736 | 9/1989 | Treitz | 73/117 |
| 5,101,660 | 4/1992 | La Belle | 73/117 |

FOREIGN PATENT DOCUMENTS 1281821 7/1972 United Kingdom .

Primary Examiner—Robert Raevis
Attorney, Agent, or Firm—Roger L. May; Raymond L. Coppiellie

[57] ABSTRACT

A traction control road simulator (10) is disclosed as having a separate electric motor (12) for controllably applying torque to each axle (14) of a vehicle (16), a speed sensor (46) for determining the speed of each motor (12) and a motor controller (52) for directing each electric motor (12) to apply positive and negative torque to its associated axle (12) to simulate various road conditions in response to the speed signal and according to instructions. A brake (54) is also provided to simulate rapidly changing road conditions.

8 Claims, 3 Drawing Sheets

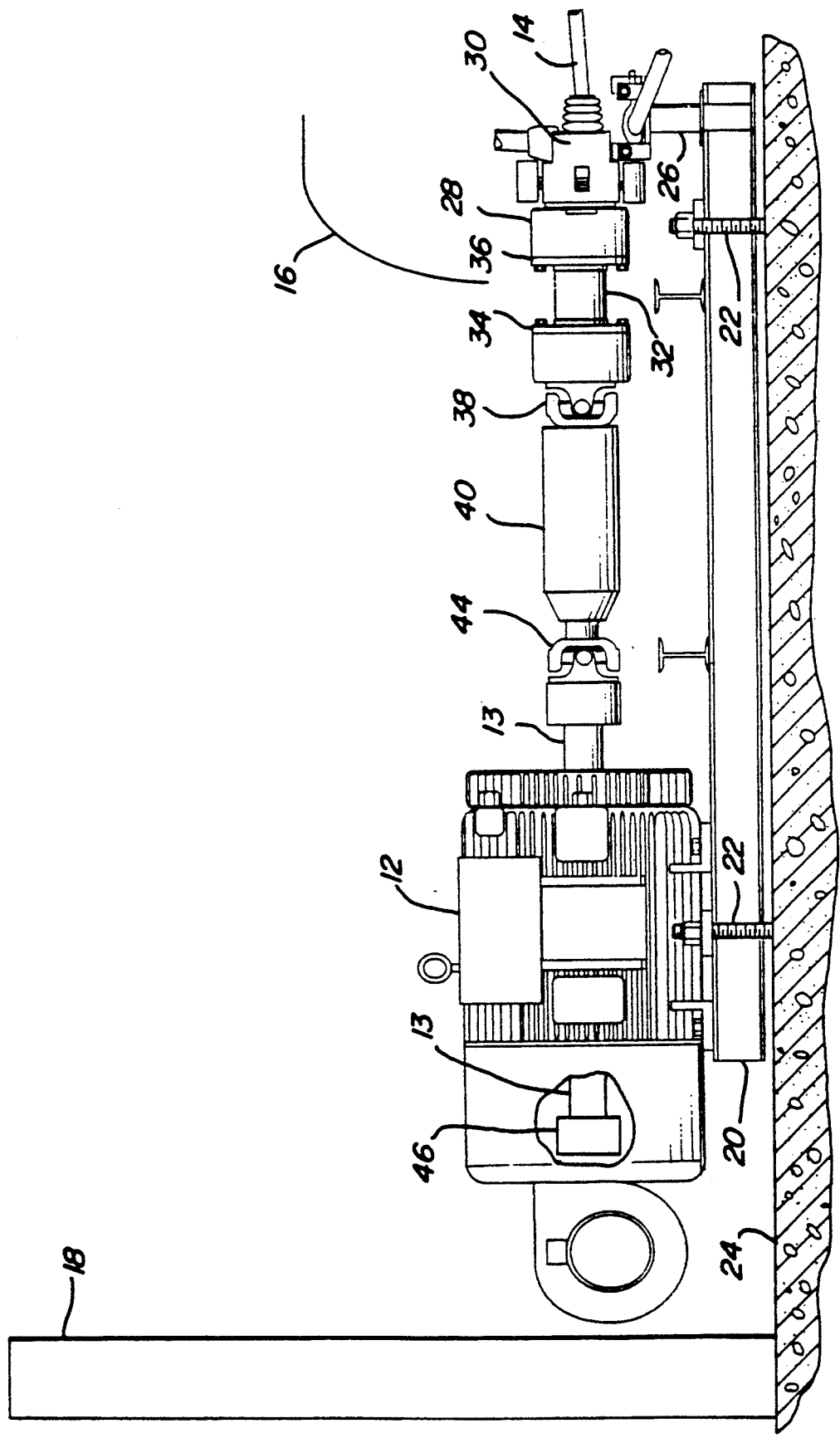

TRACTION CONTROL ROAD SIMULATOR

TECHNICAL FIELD

This invention relates to an apparatus and method for simulating variable driving conditions and for measuring the dynamic responses of a vehicle to the simulated conditions.

BACKGROUND ART

Vehicle traction control system testing is important to confirm anti-lock brake and traction control system performance. Performing low friction coefficient tests under actual road conditions is less than satisfactory for several significant reasons. The remote location of most test sites does not facilitate the provision of an adequate level of engineering and physical support. The variability of test conditions and driver performance increases the difficulty of data evaluation and possibly masks important incremental traction control performance changes. In addition to these problems, winter conditions are available only during a limited portion of each year; and access to areas having suitable conditions is often inconvenient. Testing done at warm climate proving grounds using specially prepared surfaces is inadequate because the coefficient of friction is too high and is generally not controllable.

In attempting to solve the above problems, various apparatuses for dynamically testing a vehicle have been designed. For example, U.S. Pat. No. 4,825,690, issued to Mears on May 2, 1989 discloses a method for controlling a dynamometer to more accurately simulate on-road vehicle operation. A power absorption and motoring unit is typically connected to the powertrain of the vehicle by rotatable rollers upon which vehicle wheels rest or by direct connections to the output shaft of a vehicle engine and transmission to simulate road operating forces. Force and speed transducers measure the force and speed of the power absorption and motoring unit at intervals so that changes in the force produced by changes in vehicle power can be determined. A feed-forward force necessary to bring the power absorption and motoring unit force to a level required to maintain vehicle acceleration and speed at road equivalency is determined, and the power absorption and motoring unit is adjusted to produce the determined force. The feed-forward force includes a factor that compensates for speed-matching errors resulting from large differences between the effective masses of the vehicle and the dynamometer.

U.S. Pat. No. 4,621,524, issued to von Thun on Nov. 11, 1986 discloses a circuit layout for the simulation of moments of inertia of a vehicle on a test stand. The circuit and an associated process utilize a test stand and a test vehicle elastically joined to represent an n-mass oscillator. An m number of additional masses are imitated by means of electronic functional elements so that regulation of the technical structure corresponds to a differential equation system of a (n+m) mass system. An airgap, moment-controlled, electric machine is used as a transmission element between the electronic functional elements and mechanical masses. Vehicle inertial moments are simulated by setting time constraints and amplification factors of the electronic functional elements. Vehicle vibration behavior (natural frequency and attenuation) can also be imitated by the electronic functional elements.

Great Britain Patent No. 1,281,821, issued to Pagdin and Forster and published on Jul. 19, 1972, discloses a method and apparatus for measuring output characteristics of a rotary moving part. The method includes imparting the rotation of the part to a rotary inertia means and generating a series of primary frequency signals representative of the angular displacement of the rotary inertial means. Groups of primary signals are generated at various times and input to a computer, which arithmetically derives a characteristic to be determined.

While each of the above apparatus functions with a certain degree of efficiency, none discloses the advantages of the improved traction control road simulator of the present invention as is hereinafter more fully described.

DISCLOSURE OF THE INVENTION

An object of the present invention is to provide an improved traction control road simulator capable of closely simulating road-tire nonlinear interface characteristics, including tractive force versus slip and spin, representing varying road conditions for each driven axle of a vehicle and measuring the dynamic response of the vehicle to the conditions.

Another object of the present invention is to provide an improved traction control road simulator capable of simulating significant and rapid changes in friction coefficients such as when a wheel travels from dry pavement to ice or vice versa.

A feature of the present invention is that the improved traction control road simulator is capable of applying and of absorbing torque to simulate both acceleration and deceleration conditions.

Another feature of the present invention is that a traction control road simulator is provided in which the amount of torque applied can be changed very quickly.

An advantage of the present invention is that the improved traction control road simulator is capable of providing independently controlled torque to each individual axle.

Another advantage of the present invention is that test vehicle wheels and dynamometer inertia wheels are not required because vehicle component inertia is simulated by the computer.

In realizing the aforementioned and other objects, features and advantages, an embodiment of the traction control road simulator of the present invention includes a separate electric motor for controllably applying torque to and absorbing torque from each axle of a vehicle. A torque meter is connected between each electric motor and its associated axle for sensing the amount of torque therebetween and generating a torque signal representative thereof. A speed sensor, such as an incremental shaft position encoder, is connected to each electric motor for sensing the rotational speed and generating a speed signal representative of the rotational speed. A motor controller directs each electric motor to apply positive and negative torque to its associated axle to simulate various road conditions in response to speed signals and according to instructions.

Another embodiment of the traction control road simulator of the present invention includes a brake connected between each electric motor and its associated axle. The brake is applied to simulate conditions of rapid transition from road surfaces having a low to a high friction coefficient, such as from ice covered pavement to dry pavement, and vice versa.

The objects, features and advantages of the present invention will be readily apparent from the following detailed description of the best mode for carrying out the invention when taken in connection with the accompanying drawings.

BRIER DESCRIPTION OF THE DRAWINGS

FIG. 2 is a side elevation of a unit of the traction control road simulator partially broken away and showing details of its connection to a driven axle of a vehicle;

BEST MODE FOR CARRYING OUT THE INVENTION

Figure 1:
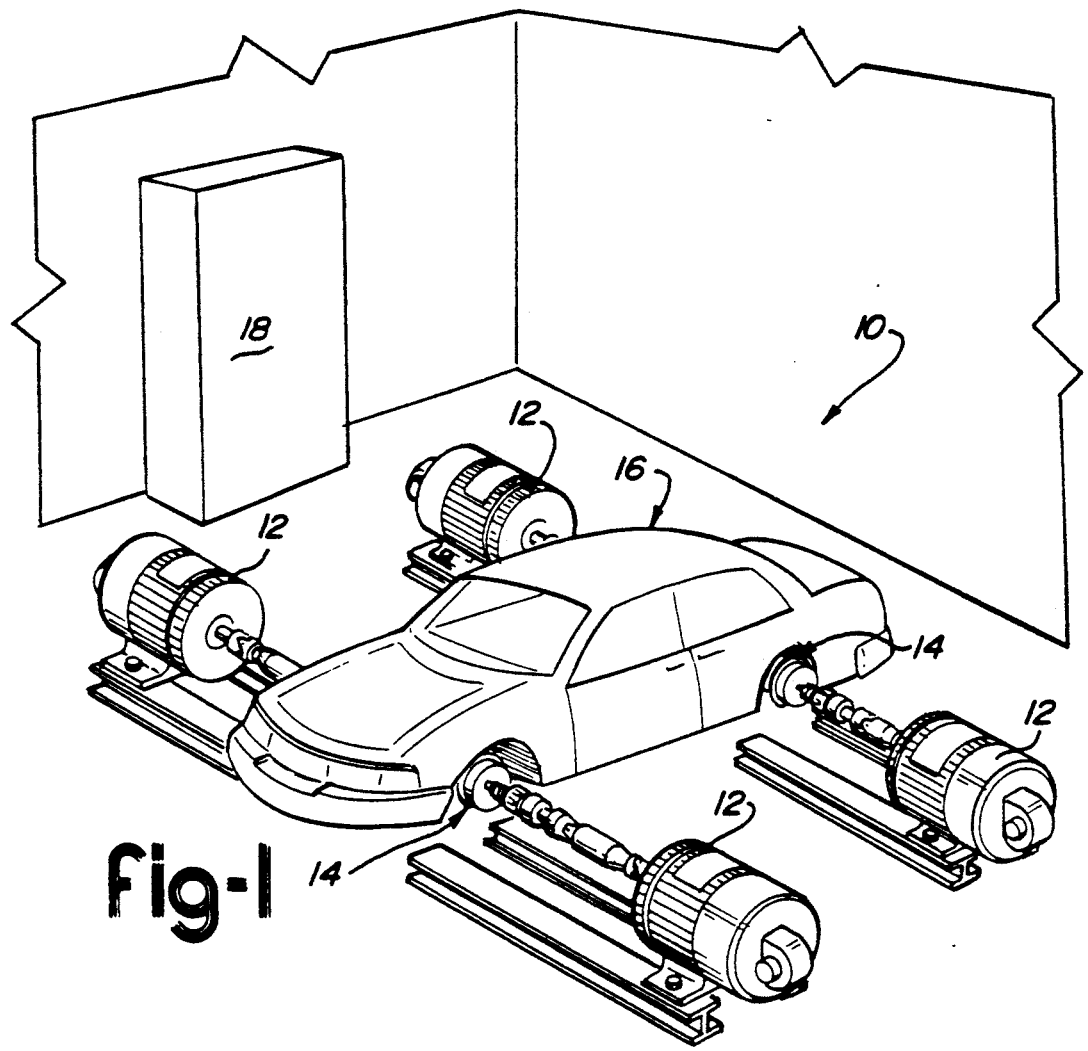
FIG. 1 is a perspective view of the traction control road simulator of the present invention shown in an environment in which it is typically used.

FIG. 1 of the drawings represents a traction control road simulator, generally indicated by the reference numeral 10, as it would be mounted in a typical environment. A separate motor 12, or torque generating means, is connected through various sensing devices to each of four axles 14 of a four-wheel drive test vehicle 16. A console 18 is provided for housing a power supply and a motor controller. It should be noted that the motors 12 are directly connected to the axles 14 of the vehicle 16. No dynamometer inertia wheels and no vehicle tires or wheels are used. Instead, vehicle component inertia is computer simulated.

For brevity, only one detailed description of the motor installations is provided; all the motor installations are considered to be essentially the same. Each motor 12 may be mounted using a number of equally suitable methods without departing from the scope of the present invention.

As seen in FIG. 2, a single motor installation includes a motor 12 having a rotatable shaft 13. The motor 12 is adjustably secured upon a motor mount 20. The motor mount 20 is supported by a floor 24 or the like, and adjusting studs 22 are provided to level the motor mount 20. A vehicle support yoke 26 is also secured to the motor mount 20 for supporting the vehicle 16.

An axle driver 28 is coupled through a knuckle 30 of the vehicle 16 to an axle, or half shaft, 14. A torque meter 32 having an input 34 and an output 36 is connected at its output 36 to the axle driver 28 and at its input 34 to a drive shaft 40 by a first universal joint 38. The drive shaft 40 is coupled to the shaft 13 of the motor 12 by a second universal joint 44. When the motor 12 rotates its shaft 13, the drive shaft 40, torque meter 32, axle driver 28 and axle 14 are also rotated. Due to torque created when the motor 12 attempts to accelerate and decelerate the axle 14 and other vehicle parts that rotate in association therewith, torque is applied through the torque meter 32. The torque meter 32 generates a torque signal that is representative of the amount of inertial forces applied to the vehicle 16.

One embodiment of the present invention uses a 75-HP, 1200-RPM, 6-pole, 3-phase induction motor manufactured by Baldor Electric Company. It is a NEMA Design B, Class F motor having a squirrel-cage rotor. The motor utilizes a larger frame that is usually used on a 100-HP motor. Using this motor, the apparatus can provide a simulated acceleration up to 0.27 g's and a simulated coefficient of friction up to 0.45. Although a 75-HP motor is used in the disclosed embodiment, a larger motor would be preferred, especially when being used with combined traction control and automatic braking systems.

The disclosed embodiment also includes an incremental shaft position encoder, or speed sensing means, 46 mounted on the motor 12. The incremental shaft position encoder 46 is also actuated by the rotation of the shaft 13. The incremental shaft position encoder 46 generates a speed signal representative of the rotational speed of the shaft 13. The incremental shaft position encoder 46 has a high resolution, preferably of at least 2500 pulses per revolution.

Figure 3:
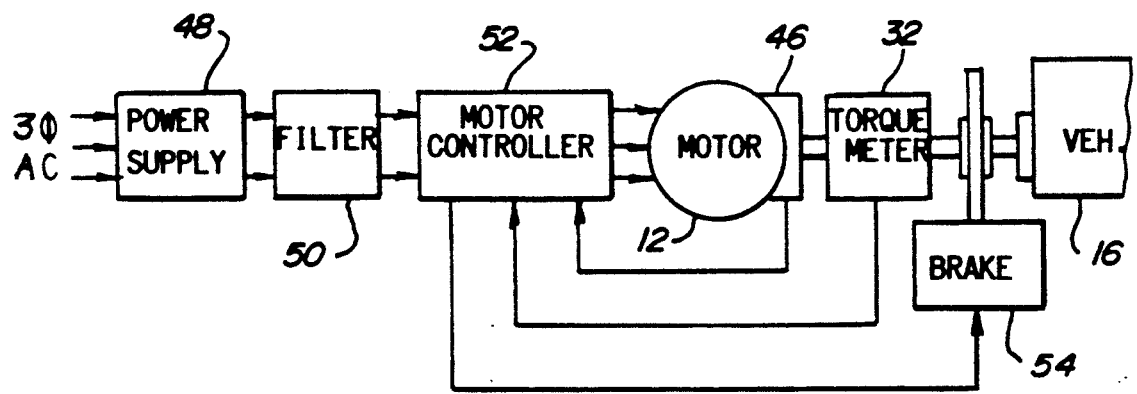
FIG. 3 is a block diagram of basic elements of the traction control road simulator.

With reference to FIG. 3 of the drawings, a regenerative direct current (DC) power supply 48 is used in the disclosed embodiment of the traction control road simulator 10. The power supply 48 has an input electrically connected to a source of three-phase, alternating current (AC). An output of the regenerative DC power supply 48 is electrically connected, through a filter inductor and capacitor module 50, to an input of a motor controller 52. As previously described with reference to FIG. 2, the incremental shaft position encoder 46 is mounted on the motor 12; and a torque meter 32 is mounted between the motor 12 and the axle 14 of the vehicle 16. The incremental shaft position encoder 46 and the torque meter 32 are electrically connected to the motor controller 52.

The traction control road simulator 10 of the present invention may also include a brake 54 (also shown by FIG. 3) connected between each electric motor 12 and its associated axle 14 (FIG. 2).

Figure 4:
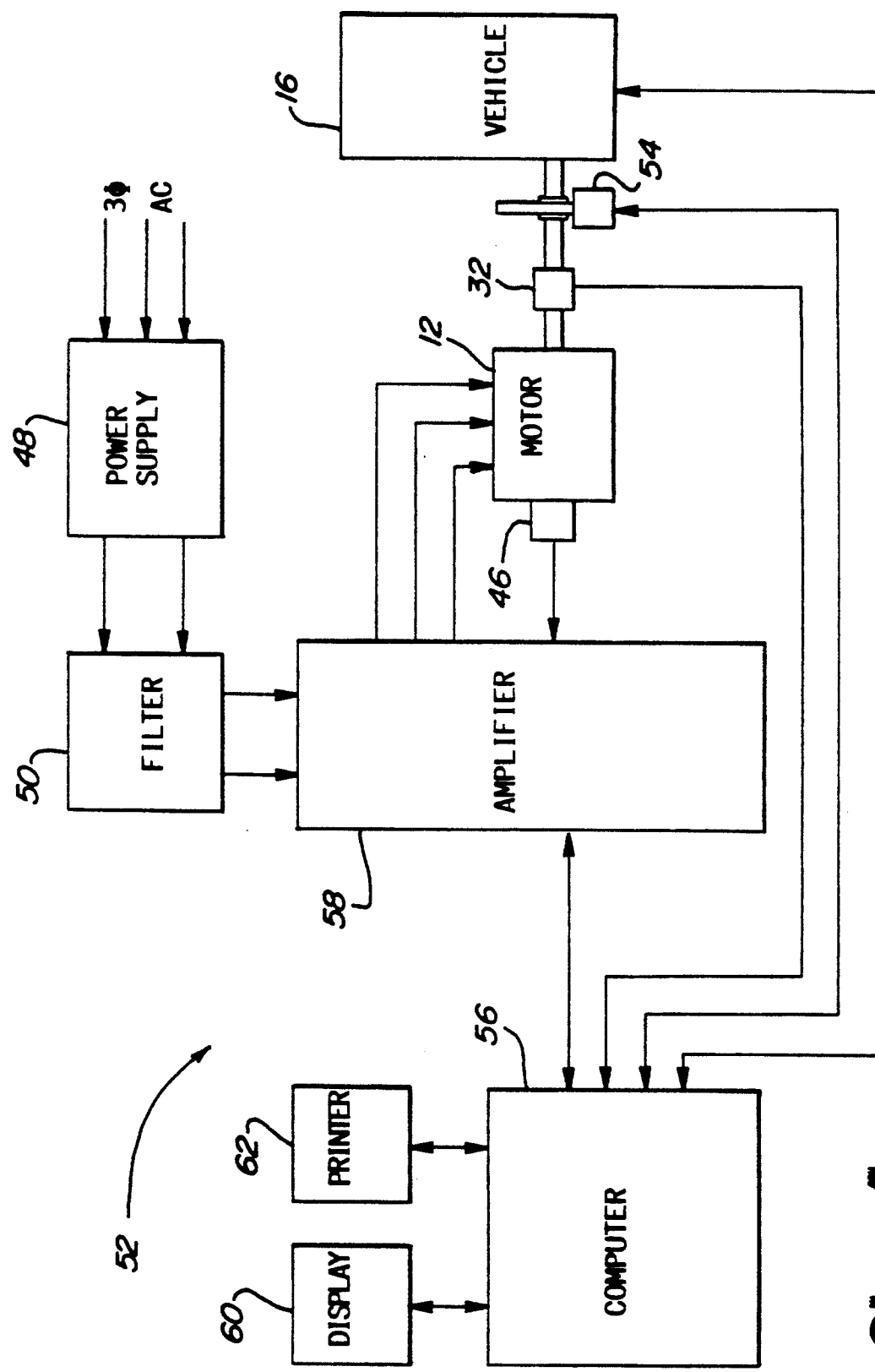
FIG. 4 is a detailed block diagram of the function control road simulator.

FIG. 4 of the drawings is similar to FIG. 3 but shows the motor controller, generally indicated by the reference numeral 52, in greater detail. The regenerative direct current (DC) power supply 48 is shown electrically connected to a source of three-phase, alternating current (AC). The power supply is electrically connected through the filter inductor and capacitor module 50 to the motor controller 52. As shown, the motor controller 52 includes a computer 56 electrically connected to a power amplifier 58. The torque meter 32, brake 54 and any additional metering devices or controls disposed on the vehicle 16 are also electrically connected to the computer 56. An optical display unit 60 and a printer 62 are also provided in connection with the computer 56. Power amplifier 58 is electrically connected to the motor 12 and to the incremental shaft position encoder 46. Torque meter 32 and brake 54 are mounted between motor 12 and axle 14 (FIG. 2) of the vehicle 16.

With reference to FIGS. 1 through 4 of the drawings, the present invention simulates roadtire nonlinear interface characteristics, including tractive force versus slip and spin, that, represent varying road conditions. The traction control road simulator 10 also measures the dynamic responses of the vehicle 16 to the simulated road conditions. The use of a number of controlled, three-phase, induction motors 12, which each applies torque to vehicle axle 14 enables the realistic independent simulation of different road conditions for different axles 14.

Three-phase induction motors are usually designed to operate with a constant voltage and a constant frequency input and at a nearly synchronous speed. The present invention, however, uses flux vector control and operates each motor 12 with variable input voltage and frequency to control torque over a range of speeds from zero to near synchronous. The windings of each motor are not connected in the usual Y, or star, configuration but rather in a delta configuration. In the delta configuration, the motor is capable of producing more power than it is thermally capable of sustaining. The flux vector control accordingly operates the motor at much lower values of slip than would be the case if it was Y connected. This scheme obtains a higher efficiency and power factor from the motor and also has the advantage of providing short-term "bursts" of twice-rated power and torque when desired.

A characteristic of flux vector control is short response time. This is important since actual road conditions are most closely simulated by the shortest time required to apply reacting torque. The mechanical configuration of the traction control road simulator 10 also contributes substantially to minimizing response time. The motor 12 is connected directly to the axles 14 of the vehicle 16 and requires no dynamometer inertia wheels and no vehicle tires and wheels. No response time is lost by slippage between dynamometer inertia wheels and vehicle tires, and none is lost waiting for these relatively massive members to accelerate to their desired angular speeds.

The elements connecting the motor 12 to the axle 14, including the drive shaft 40, the first and second universal joints, 38 and 44 respectively, and the torque meter 32, are stiff, low compliance devices and therefore also contribute to the minimization of response time. The overall response time for applying torque is relatively negligible with respect to the inherent response time of associated members in the vehicle itself. Accordingly, the traction control road simulator closely simulates actual road conditions.

A brief analysis of the physical structure of a three-phase induction motor illustrates how torque is controlled. Two coordinate systems are used for this analysis, one fixed in the motor stator and one fixed in the rotor, the coordinate systems having axes separated by 120 degrees. A transformation of equation variables associated with these coordinate systems eliminates undesirable, time-varying, mutual inductances between stator and rotor circuits and provides an arbitrary reference frame that may rotate at any velocity or remain stationary. The transformation is a coordinate transformation from three axes (referred to as abe axes), separated by 120 degrees, to two orthogonal axes (referred to as dg axes, d for direct and g for quadrature) plus a third arithmetic equation that does not involve rotation of the axes. The third relation, referred to as a zero axis, is not required for balanced conditions and disappears for three-wire systems.

The reason that flux vector control can be used derives from the fact that torque produced by each motor 12 of the present invention is proportional to the difference of two products, $\lambda_{qr}i_{dr}$ and $\lambda_{dr}i_{qr}$, involving rotor flux and rotor current components. This is illustrated by the following equation.

$$Torque = (3/2)(P/2)(\lambda_{qr}i_{dr} - \lambda_{dr}i_{qr})$$

By holding one flux component, $\lambda_{qr}$, the rotor flux component in the quadrature axis, to zero and the rotor flux component, $\lambda_{dr}$, in the direct axis constant, the torque is made to be linearly proportional to the rotor current, $i_{qr}$, in the quadrature axis. The term P is the number of motor poles and is, of course, also a constant. Because of the linearity, the rotor variables can be inferred from stator current measurements and can therefore be controlled. The motor controller 52 has been designed to maintain the flux components in their required states, which results in system responses very similar to those of a DC motor.

As previously described, the input of the regenerative direct current power supply 48 is connected to a source of electrical power. The electrical power provided for the disclosed embodiment is 3 phase, 150 amperes, 460 VAC having a frequency of 60 Hz. To provide the motor with variable voltage and frequency, the power supply 48 rectifies the AC source power. The resulting DC signal is then pulse width modulated to produce a three-phase, variable voltage or current having a variable frequency. The power supply 48 is designed to operate in a regenerative mode in which power is returned to the AC source if the load provides power to the motor 12, which then operates as a generator. The regenerative mode is also referred to as four-quadrant operation.

The output of the regenerative DC power supply 48 is connected to a filter inductor and capacitor module 50. In the disclosed embodiment, the filter inductor and capacitor module 50 includes an 8700-microfarad, 800-volt capacitor bank fed by a 3-millihenry inductor to smooth the rectified AC before it is communicated to the power amplifier 58 of the motor controller 52. The power amplifier 58 is connected to the motor 12 and to the computer 56 of the motor controller 52. The computer 56 receives the speed signal from the incremental shaft position encoder 46 and the torque signal from the torque meter 32. When large amounts of powertrain torque are applied, or under conditions simulating slippery pavement, wheel spin is simulated by angularly accelerating the axle 14. This change in angular axle speed is interpreted as the beginning of a runaway condition, and torque applied to the axle 14 is reduced accordingly.

The computer 56 is also connected to any additional metering devices or controls disposed on the vehicle 16. The computer 56 controls input voltage and frequency to the motor 12 to simulate road conditions and monitors the signals from the various sensors to measure the vehicle responses to the simulated road conditions. The optical display unit 60 and the printer 62 are used for displaying and recording data associated with the road condition simulations and vehicle response measurements.

In another embodiment of the present invention, the computer 56 is also connected to the brake 54. The brake 54 is used to simulate conditions of rapid transition from road surfaces having a low to a high friction coefficient, such as from ice covered pavement to dry pavement, and vice versa. Under control of the computer 56, the brake 54 is applied briefly to simulate road load and inertial load and then released when low friction coefficient conditions are to be simulated. The brake 54 used in the other embodiment is a hydraulically actuated brake similar to a vehicle disk brake.

Just as torque can be applied by an electric motor 12 to each axle 14, each axle can be braked individually to simulate split friction coefficient conditions. Thus the motor controller 52 direct each electric motor 12 to apply positive and negative torque to its associated axle 14 to simulate various road conditions involving relatively low friction coefficients and directs each brake 54 to apply negative torque to its associated axle 14 to simulate conditions involving relatively rapid transitions from low to high coefficients and vice versa.

Although a three-phase induction motor is used to supply torque in the embodiment disclosed herein, it should be understood that other sources of controllable torque, for example, a DC motor or a hydraulic motor, can also be used without departing from the scope and spirit of the present invention.

While the best modes for carrying out the invention have been described in detail, those familiar with the art to which this invention relates will recognize various alternative designs and embodiments for practicing the invention as defined by the following claims.

I claim:

1. An apparatus for simulating a set of variable driving conditions and for measuring the dynamic responses of a vehicle to the conditions, the vehicle having at least one axle, the apparatus comprising:

a drive shaft having a first end and a second end, the first end being connected to the at least one axle;

torque generating means, including an electric motor having a shaft, connected to said second end of said drive shaft for controllably applying torque to the at least one axle of the vehicle;

a power supply for converting electrical line power from a source thereof to electrical power having controllable voltages, currents and frequencies;

speed sensing means, including an incremental shaft position encoder disposed on said motor to generate electrical pulses in response to rotation of said motor shaft, for sensing the rotational speed of the torque generating means and generating a speed signal representative thereof;

control means for controlling the application of torque to the at least axle by said torque generating means to simulate various road conditions according to instructions and in response to the speed signal received from said speed sensing means, said control means including a power amplifier electrically connected to said power supply to receive electrical power therefrom and to supply electrical power to said motor, said control means also including a computer electrically connected to said incremental shaft position encoder to receive the speed signal therefrom, said computer also being electrically connected to said power amplifier for controlling the application of power from said power amplifier to said motor in response to the speed signal and in turn controlling the amount of torque generated by said motor; and a brake connected between said electric motor and the at least one axle and controlled by said computer, said brake being applied briefly to simulate road load and inertial load and then released when low friction coefficient conditions are to be simulated.

2. The apparatus as defined by claim 1, further including a torque sensing meter connected between said motor and the at least one axle to sense the amount of torque therebetween and to generate a torque signal representative of the amount of torque sensed.

3. The apparatus as defined by claim 1, wherein said electric motor comprises a three-phase induction motor having stator windings and a squirrel cage rotor.

4. The apparatus as defined in claim 3, wherein the stator windings of said electric motor are connected in a delta configuration.

5. The apparatus as defined by claim 1, wherein said brake is a hydraulically operated disk brake.

6. The apparatus as defined by claim 1, further including a display unit electrically connected to said computer for visually displaying road condition simulation and vehicle response data under control of said computer.

7. The apparatus as defined by claim 1, further including a printer electrically connected to said computer for printing road condition simulation and vehicle response data under control of said computer.

8. The apparatus as defined by claim 1, wherein said power supply is operated in a regenerative mode to return power to the source thereof when said motor is load driven.

* * * * *